United States Patent [19]

Destree et al.

[11] Patent Number: 4,585,487
[45] Date of Patent: Apr. 29, 1986

[54] FILIFORM ELEMENTS USABLE FOR REINFORCING MOLDABLE MATERIALS, PARTICULARLY CONCRETE

[76] Inventors: Xavier P. Destree, Av. des Noisetiers 39, Brussels B-1170; Angelo A. Lazzari, Av. W. Churchill 224, Brussels B-1180, both of Belgium

[21] Appl. No.: 648,158

[22] PCT Filed: Dec. 21, 1983

[86] PCT No.: PCT/BE83/00023
§ 371 Date: Aug. 29, 1984
§ 102(e) Date: Aug. 29, 1984

[87] PCT Pub. No.: WO84/02732
PCT Pub. Date: Jul. 19, 1984

[30] Foreign Application Priority Data

Dec. 30, 1982 [BE] Belgium ............... 209834

[51] Int. Cl.⁴ .................... C04B 7/02
[52] U.S. Cl. .................... 106/99; 428/364; 428/369; 428/371; 428/399; 428/400; 428/606
[58] Field of Search .......... 428/364, 399, 400, 369, 428/371, 606; 106/99

[56] References Cited

U.S. PATENT DOCUMENTS

| | | | |
|---|---|---|---|
| 2,677,955 | 5/1954 | Constantinesco | 72/50 |
| 3,592,727 | 7/1971 | Weaver et al. | 428/399 |
| 4,229,501 | 10/1980 | Kern | 428/399 |
| 4,233,364 | 11/1980 | van Thiel | 428/400 |
| 4,297,414 | 10/1981 | Matsumoto | 428/399 |
| 4,379,870 | 4/1983 | Matsumoto | 428/400 |

FOREIGN PATENT DOCUMENTS

| | | | |
|---|---|---|---|
| 2160180 | 6/1973 | France | 106/99 |
| 515003 | 11/1939 | United Kingdom | 106/99 |
| 1446855 | 8/1970 | United Kingdom | 106/99 |

*Primary Examiner*—George F. Lesmes
*Assistant Examiner*—P. R. Schwartz

[57] ABSTRACT

Filiform element usable for reinforcing moldable materials particularly concrete, said filiform element having crimpings or corrugations distributed over its length, showing the following features: maximum wave amplitude of the longitudinal axis: 1 to 1.5 d; maximum wave-length: 10 d; minimum wave-length: 7 d; maximum fiber length: 65 d; minimum fiber length: 45 d; fiber diameter (d): max. 1.2 mm; nature of the steel: ultimate tensile strength higher than 110 kg/mm² and lower than 150 kg/mm².

3 Claims, 2 Drawing Figures

FILIFORM ELEMENTS USABLE FOR REINFORCING MOLDABLE MATERIALS, PARTICULARLY CONCRETE

The present invention relates to filiform or thread-like elements, termed fibers, which may be used for reinforcing moldable materials with binder of the hydraulic or non-hydraulic type.

Among the various types of fibers which may be used for such a reinforcement, there is a family of filiform fibers of various dimensions provided with uniform corrugations distributed over their length.

Prior art fibers of this family cannot be effective in reinforcing concrete. Indeed, in order to ensure a satisfactory anchoring, in materials to be reinforced, there have been used corrugations of high amplitude and small wave-length. Such geometrical characteristics cause very important processing difficulties when these fibers are mixed with concrete due to their very strong tendency to ball together i.e. to cling to one another to form balls of fibers tangled up in the concrete. These processing or working difficulties have doomed the use of this type of fibers.

However, after study of all factors governing the reinforcement of stone-like materials by means of fibers of said family, it became possible to conceive a corrugated or crimped fiber of the kind described which has optimum features and distinguishes from the prior art fibers by a true concrete-reinforcing effect without the previously encountered processing difficulties.

In order to achieve such a conception, it has been necessary to study the influence of the following factors:
- wave amplitude
- wave-length
- fiber length
- fiber diameter
- nature of the component steel mainly characterized by its tensile strength
- strength or resistance of the matrix itself which needs to be reinforced.

In order to guarantee an efficient reinforcing effect, for example in concrete, it is necessary that the fibers remain anchored therein whichever be the stress applied thereonto. This condition is fulfilled without creating any processing or working difficulty if one adopts the following characteristics for reinforcing a conventional concrete as used in building:

| | |
|---|---|
| maximum wave amplitude of longitudinal axis: | 1 to 1.5 d |
| maximum wave length: | 10 d |
| maximum fiber length: | 65 d |
| minimum fiber length: | 45 d |
| nature of the steel: its ultimate tensile strength is higher than 110 kg/mm² and lower than 150 kg/mm² | |
| fiber diameter (d) | max. 1.2 mm |

Example of optimum fiber for use in an amount of 20 to 40 kg/m³ of concrete or 0.25 to 0.5% by volume depending on the type of concrete element to be reinforced:

| | |
|---|---|
| diameter | 1 mm |
| wave amplitude | 1 mm |
| wave length | 8 mm |
| fiber length | 60 mm |
| ultimate tensile strength | 130 kg/mm². |

Figure 1:
FIG. 1 represents a crimped or corrugated fiber at scale 1/1.
Figure 2:
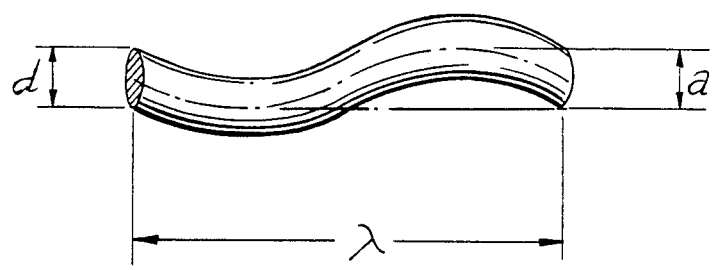
FIG. 2 represents at greater scale a portion of the fiber illustrated in FIG. 1.

There is shown the diameter d, the wave length λ and the amplitude a.

The waves or crimpings are obtained in a manner known per se.

Thus, for example, a coiled wire is uncoiled and profiled in continuous way to form corrugations by passing between rotating male and female rollers of appropriate profile. The wire is thereafter cut to length through a pair of rotating wheels the one of which is toothed and the other of which is smooth, the rotational speed of said wheels determining the length of cut wire.

It should be understood that the invention is not restricted to the above-described details which are given only by way of example.

We claim:

1. Fiber of steel wire usable for reinforcing moldable materials particularly concrete, said fiber having uniform wave shaped corrugations distributed over its length, with the following features:

| | |
|---|---|
| maximum wave amplitude | 1 to 1.5 d |
| maximum wave-length | 10 d |
| minimum wave-length | 7 d |
| maximum fiber length | 65 d |
| minimum fiber length | 45 d |
| fiber diameter (d) | max. 1.2 mm |
| nature of the steel: ultimate tensile strength higher than | 110 kg/mm² |
| and lower than | 150 kg/mm². |

2. Fiber according to claim 1, characterized by:

| | |
|---|---|
| a diameter of | 1 mm |
| a wave amplitude of | 1 mm |
| a wave-length of | 8 mm |
| a length of | 60 mm |
| steel having an ultimate tensile strength of | 130 kg/mm². |

3. Fiber according to claim 2, when used in an amount of 0.25 to 0.5% by volume in a conventional concrete for building.

* * * * *